Feb. 11, 1936.  C. H. HAPGOOD  2,030,513
VALVE FOR CONTROLLING FLOW OF MILK AND AIR IN MILKING MACHINES
Filed June 3, 1932  2 Sheets-Sheet 1

INVENTOR
Cyrus Howard Hapgood

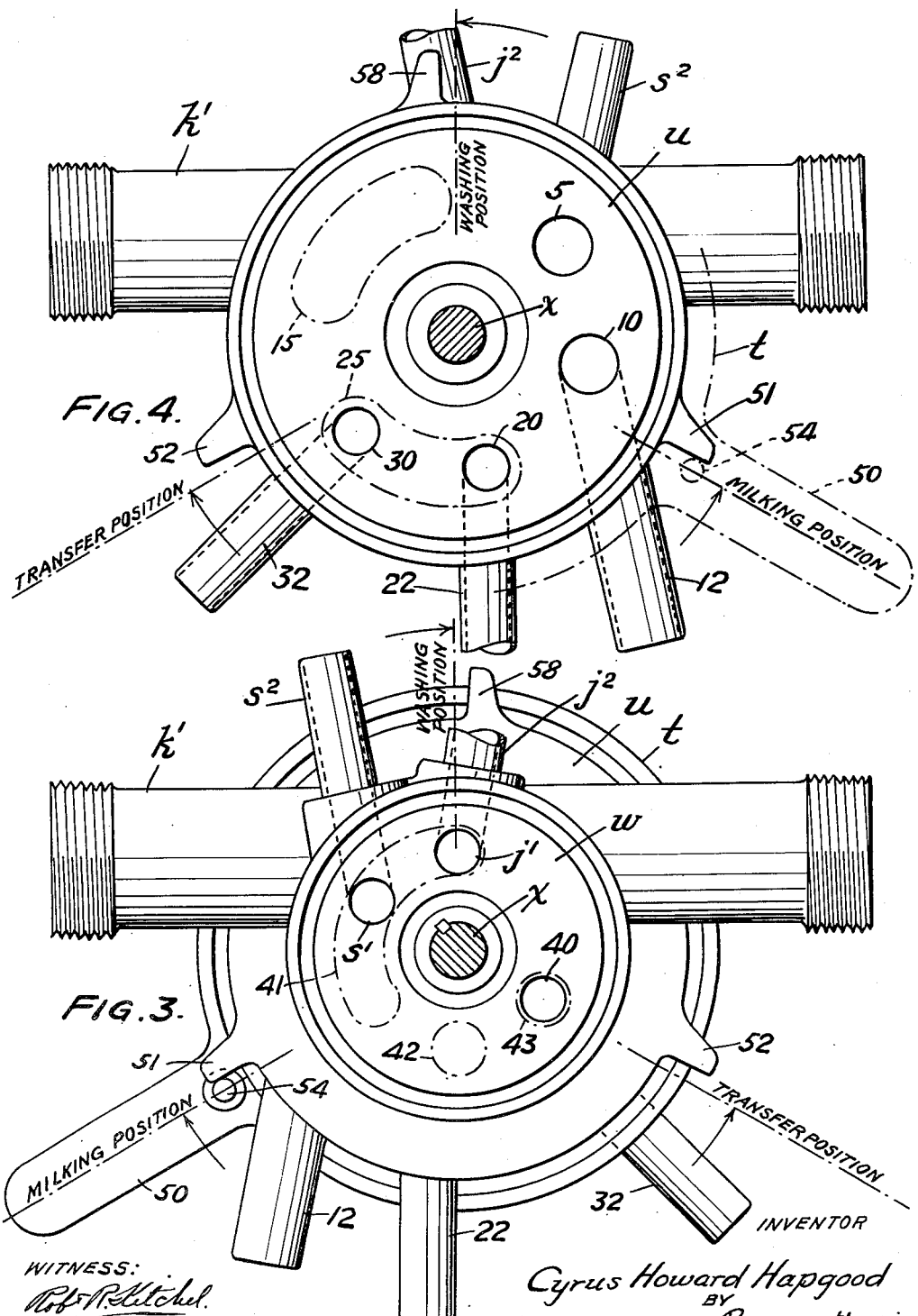

Patented Feb. 11, 1936

2,030,513

UNITED STATES PATENT OFFICE 2,030,513

VALVE FOR CONTROLLING FLOW OF MILK AND AIR IN MILKING MACHINES

Cyrus Howard Hapgood, Nutley, N. J., assignor to The De Laval Separator Company, New York, N. Y., a corporation of New Jersey Application June 3, 1932, Serial No. 615,119

14 Claims. (Cl. 277—4)

In a patent issued to me February 23, 1932, No. 1,846,805, there is disclosed a milking machine comprising a milk pipe line, a vacuum pipe line, teat cups and a milk pail; in combination with a single master plug valve which, in the milking position, connects the pail top with a vacuum hose leading to the vacuum pipe line and with the teat cups, and which, in the milk discharge position, connects the pail top with atmosphere and the pail bottom with the milk pipe line. There is also mounted on the vacuum pipe line a vacuum valve which controls the connection of said vacuum hose with the vacuum pipe line.

The machine of this patent is operative, but there is danger of occasional leakage in the valve, due primarily to the difficulty of maintaining a plug valve tight after it becomes worn by use.

Leakage of air into the milk pipe line is a condition which should be guarded against with certainty, since it results in contamination of the milk.

The present invention has for its objects: to provide a master valve which will not leak; to change the valve arrangement so as to make the air connections entirely independent of the milk connections; also to prevent the machine from operation to milk if the vacuum valve is not operated in proper sequence with the master valve; also to provide for establishing, by means of the master valve, a new series of connections which will enable the whole milking machine to be flushed out.

A preferred embodiment of the invention is shown in the drawings, in which—

Fig. 3 is an elevation view of the valve structure looking in the direction of the arrow 3, Fig. 2, with the air-controlling valve removed but showing the ports therein in dotted lines.

Fig. 4 is an elevational view of the valve structure looking in the direction of the arrow 4, Fig. 2, with the milk-controlling valve removed but showing the ports therein in dotted lines.

Figure 1:
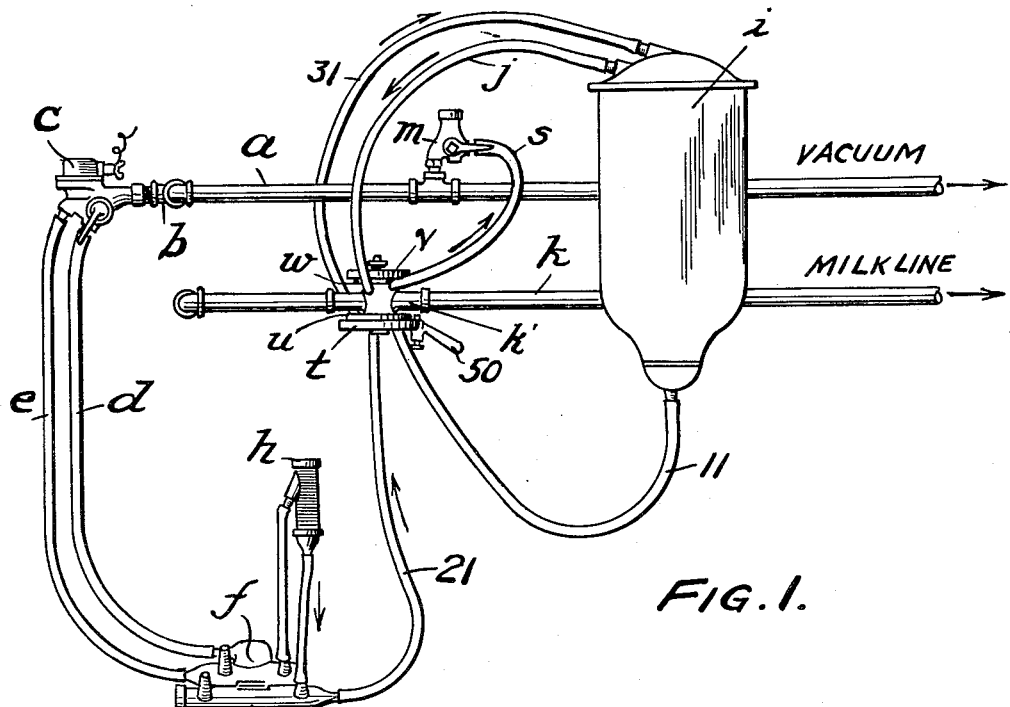
Fig. 1 is a diagram of the milking mechanism, with the shaft of the master valve shown vertical, instead of horizontal, to more clearly show the hose connections.
Figure 2:
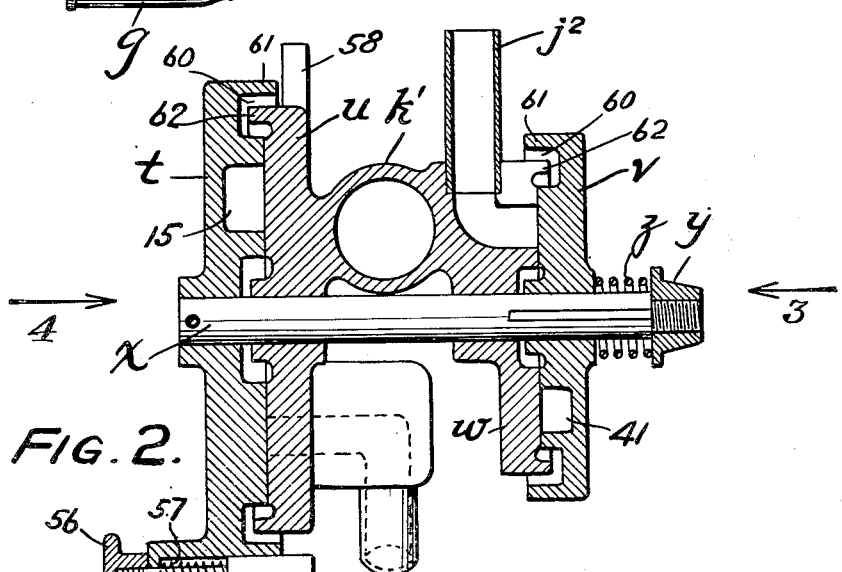
Fig. 2 is a section through the valve structure.

Along the vacuum pipe line $a$ are mounted any number of T's $b$, to any of which is attached a connector $c$ connected with a vacuum hose $d$ and a pneumatic pulsation hose $e$. The connector $c$ is ported to connect vacuum hose $d$ with the vacuum line $a$ and carries a magnetically operable pneumatic pulsation valve (not shown) whereby pulsation hose $e$ is connected alternately with the vacuum pipe line $a$ and with atmosphere.

The hose $d$ and $e$ connect with the valve chamber $f$ of a claw, the operation of the valve in this chamber being controlled by the pulsations in hose $e$ and producing pulsations in the outer or pulsation chambers of the teat cups $h$. The inner or milk chambers of the teat cups communicate, through the milk chamber $g$ of the claw, with the milk hose $21$. The teat cups and claw shown and briefly described may be constructed as shown in the Leitch Patent No. 1,255,186, February 5, 1918. The claw and the vacuum hose $d$ may be omitted and the pulsation hose $e$ may connect direct with the pulsation chambers of the teat cups and the milk or teat chambers of the teat cups may connect direct with hose $21$.

On the vacuum pipe line $a$ is mounted a two-way valve $m$. The master valve on the milk pipe line may be operated, as hereinafter fully described, either to connect the milk hose $21$ with a milk hose $31$ leading to the top of the pail $i$, or to connect the milk hose $11$ from the bottom of the pail $i$ with the milk pipe line $k$.

The valve $m$ during the milking operation is in the position to connect hose $s$ with the vacuum pipe line $a$. When the master valve is moved into the position (shown in Fig. 4) to connect hose $21$ and $31$, the pail is connected, through hose $j$ and $s$, with the vacuum pipe line and milk is drawn from the teat cups $h$ into the pail $i$. When the master valve is moved into position to connect the hose $11$ from the pail bottom with the milk pipe line $k$, the top of the pail is connected with atmosphere through hose $j$, and milk is withdrawn from the pail into the milk pipe line $k$.

The construction of valve $m$ need not be described in detail since it forms no part of the present invention. It suffices to say that it is ported so that when moved into one position it connects hose $s$ with the vacuum pipe line $a$ and when moved into the other position it connects hose $s$ with the atmosphere.

The master valve is a compound valve constructed as follows: Secured on or integral with a pipe section $k'$ interposed in the milk pipe line is a casting enlarged at one end to form a disc-shaped valve block or seat $u$ and at the other end to form a disc-shaped valve block or seat $w$. Through this casting extends a turnable stud or shaft $x$, to one end of which is secured a disc-shaped milk valve $t$ applied to and turnable on the face of the valve block $u$ and to the other end of which is splined a disc-shaped air valve $v$ applied to and turnable on the face of the valve block $w$. The shaft $x$ has a reduced threaded end on which is screwed a nut $y$, between which and the valve $v$ is confined a coil spring $z$, whereby both valves $t$ and $v$ may be maintained in fluid-tight contact with their respective valve blocks.

The valve block $u$ is provided with four ports extending through it from face to face. One port 5 communicates with the milk pipe section $k'$. A second port 10 opens into a nozzle 12 (mounted on the valve block $u$) to which is connected the milk hose 11 that extends to the bottom of pail $i$. A third port 20 opens into a nozzle 22 (mounted on the valve block $u$) to which is connected the milk hose 21 that extends to the milk chamber $g$ of the teat cup claw. A fourth port 30 opens into a nozzle 32 (mounted on the valve block $u$) to which is connected the milk hose 31 that extends to the top of the pail $i$.

The valve $t$ is provided on its inner face with two arcuate recesses 15 and 25.

The valve block $w$ is provided with three ports extending through it from face to face. One port $j'$ opens into a nozzle $j^2$ to which is connected the air hose $j$ that extends to the top of pail $i$. A second port $s'$ opens into a nozzle $s^2$ to which is connected the air hose $s$ that extends to the vacuum valve $m$. A third port 40 opens to the atmosphere.

The valve $v$ is provided with an arcuate recess 41 and two circular holes 42 and 43 extending through it from face to face.

In Figs. 3 and 4 the master valve is shown in milking position. In this position, if valve $m$ has been turned to connect the hose $s$ with the vacuum pipe line $a$ the following air and milk connections are established. Air is exhausted from the top of the pail through hose $j$, port $j'$, recess 41, port $s'$, hose $s$, valve $m$ and vacuum pipe line $a$. Milk flows from the teat cups through hose 21, port 20, recess 25, port 30 and hose 31 into the milk pail $i$.

When the master valve is turned approximately 120° from the position shown in Figs. 3 and 4, communication between ports 20 and 30 is closed and recess 15 is moved into position to connect ports 5 and 10, thereby connecting the bottom of the pail, through milk hose 11, port 10, recess 15 and port 5, with the milk pipe line $k$. At the same time port 43 is moved into position to register with port $j'$, so that air flows through port 43, port $j'$ and air hose $j$ into the top of milk pail $i$. The air in the pail expels the milk, through hose 11, port 10, recess 15 and port 5, into the milk pipe line $k$.

It will be noted that, in this position of the master valve, port $s'$ opens against the solid face of the valve $t$, and therefore the vacuum valve $m$ is functionless.

The valve block $u$ carries stops 51 and 52 which are adapted to be engaged by a pin 54 on the valve $t$ when the valve is moved into the two positions above described. The valve is turned by means of a handle 50.

Pin 54 is seated on a hole formed in the valve $t$ and is provided with a stem 55 which extends beyond the hole and carries a head 56. A coil spring 57 surrounding the stem 55 presses the pin 54 into its normal position in alignment with stops 51 and 52. By grasping the head 56 the pin 54 may be retracted so as to clear the stop 51 and allow the master valve to be moved into a position about 120° from its milking and milk transfer positions until the pin 54 contacts with the stop 58. In this position, recess 25 of valve $t$ connects ports 5 and 10 and recess 15 of valve $t$ connects ports 20 and 30. This position of the valve allows the milking machine to be flushed out with cold water and then with steam; the flow being through the milk line $k$, port 5, recess 25, port 10, hose 11, milk pail $i$, hose 31, port 30, recess 15, port 20, hose 21 and the milk chamber $g$ of the claw to the milk chambers of the teat cups.

In this washing position of the valve, a part of the washing fluid escapes from the pail $i$ through air hose $j$ to recess 41 and hole 40 to the atmosphere, thereby flushing out of air hose $j$ any milk which may have passed thereinto as milk vapor during the milking operation. At the same time line hose $s$ is connected through port $s'$ and an aligning hole 42 with the atmosphere, while valve $m$ is so turned as to connect the other end of hose $s$ with atmosphere so that any condensate therein will drain out.

It is practicable to grind the opposing faces of valve $t$ and its valve seat and valve $v$ and its valve seat to perfect flatness, so as to eliminate danger of leakage. To further guard against leakage, due to damage while cleaning, each valve is provided with a circumferential recess 60 into which extends a peripheral flange 62 on the corresponding valve seat, and with a peripheral flange 61 which extends beyond and overlaps the periphery of said valve seat. Valve $t$ is protected at its center by affixed shaft $x$ and its seat is protected by a central raised boss. Valve $v$ is also protected at its center by a raised boss.

It will be understood that when reference is made to establishing connections with vacuum and atmosphere respectively, I mean to include as an equivalent any two substantially different absolute pneumatic pressures.

I do not herein claim the milking machine of which the master valve herein claimed is a part, said milking machine forming the subject-matter of a separate application filed June 3, 1932, Serial No. 615,117.

What I claim and desire to protect by Letters Patent is:

1. A valve structure for controlling the flow of fluid, which comprises a valve block having two pairs of ports and a valve turnable on the valve block and having two elongated recesses, said recesses and ports being so disposed that the valve is turnable into one position to establish communication through one recess between one pair of ports, into another position to establish connection through the other recess between the other pair of ports, and into a third position to simultaneously connect through the second named recess the first named pair of ports and through the first named recess the second named pair of ports.

2. A valve structure for controlling the flow of fluid, which comprises a valve block having a plane face, a valve having a plane face fitting against the plane face of the valve block and turnable thereon, the valve block having two pairs of ports opening in its face, one pair of ports being positioned within one sector of 120° and the other pair of ports being positioned within an adjacent sector of 120°, the valve having two arcuate recesses opening in its face, the centers of which are positioned approximately 120° apart.

3. A valve structure for controlling the flow of air, which comprises a valve block having a plane face, a valve having a plane face fitting against the plane face of the valve block and turnable thereon, the valve block having opening on its face two air circulation ports and an air port, the valve having a recess and two air ports, said recess and ports being so positioned that the valve is movable into one position to connect through said recess the two air circulation ports, into a second position to close one air circulation port and register one of its air ports with the other air circulation port, and into a third position to connect through said recess the last named air circulation port and the air port of the block and to register the other air circulating port with the other air port of the valve.

4. A valve structure for controlling the flow of fluid, which comprises two members, one a valve block providing a valve seat having a plane working face and having ports opening in said face, and the other a valve having a plane working face and provided with ports opening in said face and turnable upon the valve seat, the faces of said members contacting so as to prevent leakage between different ports of the same member and between non-registering ports of different numbers, one of said members extending radially beyond the other member and having adjacent its periphery a recess in its working face and the other member having a peripheral flange extending into said recess.

5. A valve structure for controlling the flow of fluid, which comprises two members, one a valve block providing a valve seat having a plane working face and having ports opening in said face, and the other a valve having a plane working face and provided with ports opening in said face and turnable upon the valve seat, the faces of said members contacting so as to prevent leakage between different ports of the same member and between non-registering ports of different members, one of said members having an inwardly extending peripheral flange and a recess in its working face within said flange and the other member having a peripheral flange extending within said recess and surrounded by the other peripheral flange.

6. A valve structure for controlling the flow of fluid, which comprises a valve block providing a valve seat having a plane working face and ports opening therein, a valve having a plane working face and provided with ports opening therein and turnable upon the valve seat, stops on the valve block and valve adapted to co-operate to arrest the turning movement of the valve when it is moved throughout an arc between two different operative positions, and hand-operable means adapted to render inoperative the stops which normally so cooperate at one end of the arc and allowing the valve to be turned beyond said arc into a third operative position.

7. A valve structure for controlling the flow of fluid, which comprises a valve block providing a valve seat having a plane working face and ports opening therein, a valve having a plane working face and provided with ports opening therein and turnable upon the valve seat, a pin turnable with the valve, and two stops on the valve block adapted to be engaged by said pin in the turning movement of the valve throughout an arc between two different operative positions, said pin being movable to enable it to clear one of said stops and allow the valve to be turned beyond said arc into a third operative position.

8. A valve structure for controlling the flow of fluid, which comprises a valve block providing a valve seat having a plane working face and ports opening therein, a valve having a plane working face and provided with ports opening therein and turnable upon the valve seat, a pin turnable with the valve, two stops on the valve block adapted to be engaged by said pin in the turning movement of the valve throughout an arc between two different operative positions, a spring normally maintaining the pin in position to engage said stops in the turning movement of the valve in opposite directions, said pin being movable to allow it to clear one of said stops and allow the valve to be moved beyond said arc into a third operative position, and a third stop on the block adapted to be engaged by the pin and arrest the turning movement of the valve when it reaches said third operative position.

9. A valve structure for controlling the flow of fluid, which comprises a valve block having a plane face, a valve having a plane face fitting against the plane face of the valve block and turnable thereon, the valve block having two pairs of ports opening in its face, one pair of ports being positioned within one sector of 120° and the other pair of ports being positioned within an adjacent sector of 120°, the valve having two arcuate recesses opening in its face, the centers of which are positioned approximately 120° apart, the valve being movable into three approximately equally spaced apart radial positions to effect connections respectively between the ports of only one pair, between the ports of only the other pair, and between the ports of each pair.

10. A valve structure for controlling the flow of milk and air in a milking machine, said structure comprising a valve block having opening on one face two pairs of milk ports and having opening on another face two air ports, and two valves, turnable respectively on said two faces of the valve block: one valve having two recesses so disposed that when the valve is turned into one operative position it establishes communication through one recess between one of said pairs of milk ports and when turned into another operative position it establishes communication through the other recess between the other pair of milk ports; the other valve having a recess adapted in one of its operative positions to connect said air ports and a port adapted in another of its operative positions to register with one of said air ports: and means connecting said valves and constraining them to move in unison to enable them to establish simultaneously the first specified milk and air connections and to establish simultaneously the latter specified milk and air connections.

11. A valve structure for controlling the flow of milk and air in a milking machine, said structure comprising a valve block having opening on one face two pairs of milk ports and having opening on another face three air ports, and two valves turnable respectively on said two faces of the valve block into three different positions: one valve having two recesses so disposed that when the valve is turned into one position one of said recesses connects the milk ports of one pair, when moved into a second position the other recess connects the milk ports of the other pair and when moved into a third position one recess connects the milk ports of one pair and the other recess connects the milk ports of the other pair; the other valve having a recess and a port so disposed that when the valve is turned into one position said recess connects two of said air ports, when moved into another position its port registers with one of the last named air ports, and when turned into a third position said recess connects one of the last named air ports with the third air port: and means connecting said valves and constraining them to move in unison into each of their said three positions.

12. A valve structure for controlling the flow of milk and air which comprises two valve blocks in fixed relation one with another and having plane faces facing in opposite directions, two valves having plane faces fitting against the faces of the respective valve blocks and turnable thereon, one valve block having two ports opening in its face, the other valve block having two pairs of ports opening in its face; the first turnable valve engaging the first valve block having a recess and an air port so located that in one of its positions its recess connects the two ports in the first valve block and in another of its positions one of the ports in the first valve block is closed while the other of its ports is connected with said air port; the second turnable valve engaging the second valve block having two recesses so located that in one of its positions one recess connects the ports of one of said pairs while in the other of its positions its other recess connects the ports of said pair and its first named recess connects the ports of the other pair, and mean connecting said valves whereby they may be turned in unison into the first position specified for each valve or into the second position specified for each valve.

13. A valve structure for controlling the flow of fluid, which comprises a valve block providing a valve seat having a plane working face and ports opening therein, a valve having a plane working face and provided with ports opening therein and turnable upon the valve seat, a pin turnable with the valve, and three stops on the valve block having pin-engaging faces, two of which face in one circumferential direction and one of which faces in the other circumferential direction, two of said stops facing in opposite directions being adapted to be engaged by the pin in the turning movement of the valve throughout an arc between two different operative positions, said pin being movable to clear one of said stops and allow the valve to be turned beyond said arc into position to engage its pin with the third stop.

14. A valve structure for simultaneously controlling the flow of milk and air which comprises a pipe section and in fixed relation therewith two valve blocks having plane working faces facing in opposite directions, two ported valves, one for each valve seat, each having a plane face fitting against its seat, means to turn both valves simultaneously, nozzles carried by each valve block, each valve block provided with ports opening in its face and communicating respectively with the nozzles carried thereby and not communicating with the ports in the other valve block, one valve block having opening in its face a port communicating with said pipe section, the ports in each valve block being adapted to cooperate with the ports in the corresponding valves, when the latter are turned, to thereby simultaneously establish independent fluid connections between ports of the two valves and ports carried by the two valve blocks.

CYRUS HOWARD HAPGOOD.